United States Patent [19]

Le Saux et al.

[11] Patent Number: 5,581,347
[45] Date of Patent: Dec. 3, 1996

[54] OPTIMIZATION METHOD AND DEVICE FOR DIRECT MEASUREMENT OF AN OPTICAL COMPONENT

[75] Inventors: Gilles Le Saux, Paris; Patrick Bertrand, Issy-Les-Moulineaux; Xavier Lippens; Christophe Lafay, both of Paris, all of France

[73] Assignee: Essilor International, France

[21] Appl. No.: 308,113

[22] Filed: Sep. 16, 1994

[30] Foreign Application Priority Data

Sep. 17, 1993 [FR] France ................... 93 11136
May 4, 1994 [FR] France ................... 94 05464

[51] Int. Cl.$^6$ ............................ G01B 9/00; G01M 11/00
[52] U.S. Cl. ........................... 356/124; 356/124.5
[58] Field of Search ..................... 356/124.5, 125, 356/127, 124

[56] References Cited

U.S. PATENT DOCUMENTS

| | | | |
|---|---|---|---|
| 4,125,328 | 11/1978 | Suga | 356/124 |
| 5,066,119 | 11/1991 | Bertrand | 356/124 |
| 5,066,120 | 11/1991 | Bertrand | 356/124 |
| 5,187,539 | 2/1993 | Adachi et al. | 356/127 |
| 5,406,375 | 4/1995 | Brandstetter | 356/124 |

FOREIGN PATENT DOCUMENTS

| | | | |
|---|---|---|---|
| 0604179 | 6/1994 | European Pat. Off. | 356/124 |
| 2647912 | 12/1990 | France . | |
| 2647913 | 12/1990 | France . | |
| 55-134339 | 10/1980 | Japan | 356/124 |
| 04188038 | 7/1992 | Japan | 356/124.5 |

*Primary Examiner*—Frank Gonzalez
*Assistant Examiner*—Jason D. Eisenberg
*Attorney, Agent, or Firm*—Quarles & Brady

[57] ABSTRACT

A method and device for measurement of the geometrical or optical structure of an optical component such as a lens or a mold for making lens are provided. The method comprises the steps of illuminating the optical component to be measured with incident light having a known wavefront, measuring, in a given plane, the maps of the wavefront slopes of the light, after reflection at or transmission by the optical component, and deducing the surface topography or refraction index map of the optical component to be measured from the measurements of the slope maps by the application of at least one calculating procedure.

The calculating procedure comprises a step in which a result surface is initialized using a simple starting surface SD' and at least one optimization step; each optimization step involves calculation of the value of a merit function representative of the departure between the result surface and the surface to be measured of the optical component and, minimization of said value varying said result surface, said variation being expressed in the form of at least one intermediate surface $S_i$.

44 Claims, 7 Drawing Sheets

OPTIMIZATION METHOD AND DEVICE FOR DIRECT MEASUREMENT OF AN OPTICAL COMPONENT

BACKGROUND OF THE INVENTION

The present invention relates to a method for absolute measurement of the geometrical or optical structure of an optical component and to a device implementing it.

The method according to the invention makes it possible to provide absolute measurement of a polished surface or the distribution of the refractive index of an optical component.

Measurement of polished surfaces and/or refractive index distribution finds many practical applications in industry. It is particularly useful in the ophthalmic field for checking and measuring ophthalmic lenses. It can also be used for checking or measuring molds, for example those used in manufacturing ophthalmic lenses.

In the checking of optical components, the use of the so-called Ronchi test employing phase detection has already been proposed.

As is known, the Ronchi test consists of inserting a grating of alternately opaque and transparent parallel lines at the point of convergence of the light waves originating from an optical component to be checked, and then analysing the component of the fringes which are then observable downstream thereof.

If we limit ourselves to the laws of geometrical optics, without taking account of diffraction phenomena, these fringes represent the direction of the light rays that constitute the waves concerned and are characteristic of the aberrations thereof. Their slope reflects the difference between the corresponding wave surface and a spherical wave surface, the center of curvature of which is situated in the plane of the grating. It is consequently sufficient to measure this slope at all points on the optical component to be checked, this being achieved in practice using phase detection, and then to carry out integration in order to find defects in the surface of said component.

An optical device enabling such a method to be implemented is notably described in the article "Fringe Scanning Ronchi test for aspherical surfaces" published in "Applied optics", volume 23, number 20 of Oct. 15, 1984, as well as in the article "Phase measuring Ronchi test" in this same periodical, volume 27, number 3 of Feb. 1, 1988. Generally, this optical device comprises, arranged along an optical axis, light emitting means suitable for constituting a coherent point light source, a control station designed to carry the optical component being checked, a Ronchi grating, receiving means adapted to receive the observable image downstream of said Ronchi grating, and computing means designed to exploit this image, using phase detection.

Other optical component checking devices have been proposed. Thus, the use of two associated, substantially parallel Ronchi gratings has been proposed, the moiré fringes obtained on a screen by coherent light transmission or reflection on the surface under study then being observed. Just like the Ronchi test, the moiré patterns obtained give an indication, in terms of slope, of the differences between a plane theoretical wave surface and the wave surface obtained by transmission or reflection at the surface under study.

An optical device employing this principle is for example described in "Moiré Deflectometry—Ray Tracing Interferometry" by I. Glatt and O. Kafri, published in "Optics and Lasers in Engineering" 8 (1988), pages 277 to 320. Such a device typically comprises a collimated light source which is transmitted or reflected by the surface to be analysed, to a pair of Ronchi gratings, the image being projected onto a mat screen. Qualitative analysis of the moiré patterns obtained, when compared to the expected patterns, enables aberrations to be located. Varying the distance between the gratings allows quantitative measurements to be made together with calculation of the variations in measured wave surface compared to the plane theoretical wave surface.

Finally, in the device described in French patents 2 647 912 and 2 647 913, a map of the slopes of the actual surface to be measured is obtained by deflectometry using phase detection and, after subtracting the map of the nominal theoretical surface from the map of the the actual surface slope obtained, it is simple to obtain a map of the slopes of the defects, thus enabling the actual surface to be reconstructed, using integration. This known device, even if it enables a known ophthalmic lens to be checked with a high degree of accuracy or, more generally any known surface, does nevertheless suffer from the disadvantage of being limited to measurement of variations between a real surface and a theoretical surface. In other words, it implements a relative method involving prior knowledge of the theoretical shape of the surface to be measured.

SUMMARY OF THE INVENTION

The present invention sets out to provide a method for measuring the geometrical or optical structure of an optical component, which provides an absolute or direct measurement as it requires no prior knowledge of the theoretical shape of the surface, or the theoretical distribution of refractive index. The method makes it possible to determine the geometrical shape of a surface, or how refractive index varies within an optical component.

The present invention also provides a device enabling this method for measuring the geometrical or optical structure to be implemented with a high degree of accuracy.

The invention provides absolute or direct measurement of the geometrical structure of the surface either using transmitted or reflected light for convex or concave surfaces. It enables the actual shape of the surface to be measured accurately.

The invention also makes it possible to provide absolute measurement of the distribution of refractive index in a graded index optical component, in other words a component constituted by a material having a refractive index that varies within a range comprised between two known dioptric values.

The invention accordingly provides a method for absolute measurement of the geometrical or optical structure of an optical component comprising the steps consisting of:

illuminating said optical component with incident light having a known wavefront, measuring, in a given plane, the maps of the wavefront slopes of said light, after reflection at said optical component or transmission by said optical component, and deducing the geometrical or optical structure of said optical component from said measurements of the slope maps by the application of at least one calculating procedure.

Two ways of carrying out the said calculating procedure are offered by the invention.

In order to measure the slope maps of the wavefront of said light after reflection at said optical component or transmission by said optical component, the method of the invention preferably includes the step of determining, using a deflectometric method, the paths of the plurality of rays of said light in an image space of the optical component being measured.

By deflectometric method, any method that gives access to the lines of slope of a light beam is meant.

These methods fall into three categories:

"geometrical" methods, obtained by inserting a mask on the path of the beam (Foucault, Ronchi, Hartman, etc . . . );

moiré methods (Moiré deflectometry, Talbot interferometry, etc . . . );

differential interferometric methods (lateral, radial, etc . . .).

Such methods are described in "Optical Shop Testing" by D. Malacra, published by Wiley.

Advantageously, the rays are transposed into the space of the optical component to be measured, using optical calculation.

In a first embodiment of the method, the invention makes it possible to measure absolutely the geometrical or optical structure of the component to be measured.

Firstly, the geometrical structure of a surface of the optical component to be measured can be determined by a calculating procedure comprising:

a step in which a result surface is initialized using a simple starting surface $S_D$, at least one optimization step involving:
calculation of the value of a merit function representative of the variations induced by replacement of the surface of the optical component to be measured by said result surface and,
minimization of said value by varying said result surface, said variation being expressed in the form of at least one intermediate surface $S_I$.

Advantageously, the result surface, the simple surface $S_D$ and the one or several intermediate surfaces $S_I$ are represented by a linear combination of a family of orthogonal functions.

This absolute surface measurement then allows, among other things, the main characteristics of this surface to be calculated at each point, for example altitude, slope, principal local curvatures, etc.

Secondly, the invention makes it possible to absolutely determine the optical structure of the optical component to be measured, i.e. measurement of the refractive index distribution within a graded index optical component, in other words a component constituted by a variable index material delimited by two known dioptric values. The calculation step then comprises:

an initialization step for a result refractive index distribution, using a simple starting refractive index distribution $N_D$, at least one optimization step comprising:
calculation of the value of a merit function representative of the variations induced by replacement of the refractive index distribution of the optical component to be measured by said result refractive index distribution, and
minimization of said value by varying said result refractive index distribution, said variation being expressed in the form of at least one intermediate refractive index distribution $N_I$.

Advantageously, said result refractive index distribution, said simple starting refractive index distribution $N_D$ and the one or several intermediate refractive index distributions $N_I$ are represented by a linear combination of a family of orthogonal functions.

In this first embodiment of the method, the calculation procedure includes a plurality of optimization steps.

The orthogonal functions can be polynomials and in this case, the maximum degree of the polynomials of said linear combination in an optimization step is higher than or equal to the maximum degree of the polynomials of said combination in the preceding optimization step.

Minimization of the value of said merit function can be carried out using the least squares method.

Calculation of the value of the merit function can be carried out:

by calculating, for each ray of a plurality of rays of said light, after reflection at said optical component or transmission by said optical component:
the incident luminous ray which, upon arriving at said result surface or said result refractive index distribution calculated in said optimization process, would be reflected or transmitted in the direction of the measured ray,
the distance, in the plane of the source of the incident light or in a plane conjugate with said plane, between the point of impact of said incident ray in said plane and the center of said quasi-point source, by adding, for said plurality of rays, the squares of the distance thus calculated for each one of said rays.

According to a second embodiment, the invention makes it possible to determine the characteristics of a surface of the optical component to be analyzed in the form of maps of its principal curvatures. The calculating procedure then comprises:

a step in which derivatives are calculated, in several directions, of the maps of the slopes of the wavefront of said light after reflection at said optical component or transmission by said optical component, a calculation step starting from said derivatives, for the curvatures of the wavefront of the light after reflection at said optical component or transmission by said optical component, a step for computing a map of the principal curvatures of the surface of the optical component to be measured, starting from the curvatures thus calculated, and knowing the wavefront of the light incident on the optical component.

The invention also provides a device for carrying out the method for absolute measurement of a surface or the distribution of refractive index, comprising:

means for illuminating the optical component to be measured with light having a known wavefront, means for supporting the optical component to be measured, means for measuring the slopes of the wavefront of said light after reflection at said optical component or transmission by said optical component, and calculating means adapted to receive the results from said measuring means.

In one embodiment of the device, the measuring means comprise a Ronchi grating, a mat screen and a charge-coupled-device camera; in another embodiment they comprise a Ronchi grating and a charge-coupled-device camera.

The means for illuminating the surface to be measured preferably comprise a quasi-point source and a system for imaging said source.

The calculating means comprise a ray tracing program.

The device can also employ a laser beam to materialize the optical axis of said device.

Finally, the support means are adapted to be displaceable along the optical axis of the device or in a plane orthogonal thereto.

The features and advantages of the invention will become more clear from the description that follows of various embodiments of the invention provided by way of example, and with reference to the attached drawings.

DETAILED DESCRIPTION OF PREFERRED EMBODIMENTS

The description that follows considers the case of absolute measurement of the geometrical structure of a polished surface. It applies, mutatis mutandis, to a method for measuring the refractive index distribution of a graded index optical component, in other words a component constituted of a variable index material, comprised within two known dioptric values. For this, it is sufficient to replace the unknown "surface" S defined by z(x,y) by the unknown "refractive index distribution" n(x,y).

The measurement process can then be carried out only using transmitted light, for example using a device of the type described below in relation with FIGS. 1 and 3; a knowledge of the geometrical shape of dioptric powers and the thickness of said optical component enables its refractive index distribution n(x,y) to be measured.

The initialization step is carried out with a simple starting index distribution $N_D$, of constant refractive index.

Figure 1:
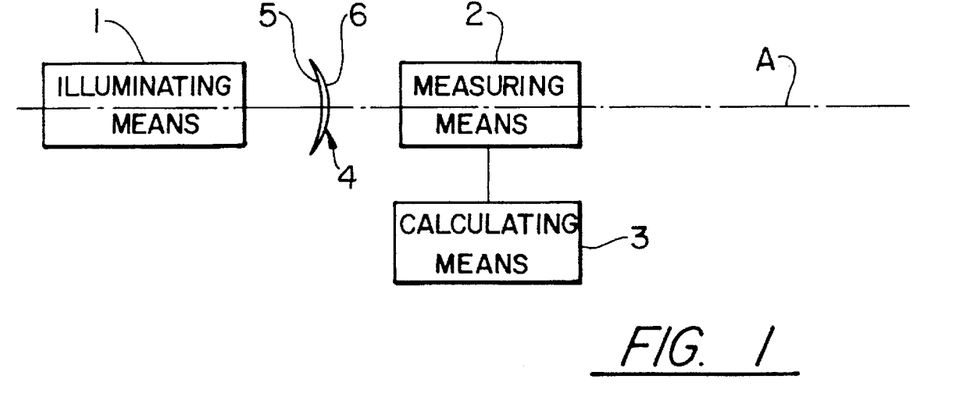
FIG. 1 is a simplified diagram showing a device according to the invention for measuring a polished surface, using transmitted light.

FIG. 1 shows a simplified diagram of a device according to the invention for measuring a polished surface using transmitted light. The term "measurement" should be taken to mean determination of the geometrical characteristics of the polished surface, such as its geometrical shape or the provision of a map of its principal curvatures. The expression "polished surface" should be taken to mean an unknown face of an optical component, such as, for example, a progressive lens. For such a lens, for which the shape of one face and the refractive index is known, it is useful to be able to analyse the characteristics of the other face, in an absolute manner. The expression "measurement using transmitted light" should taken to mean measurement of the polished surface through measurement of the light transmitted through the optical component, and in particular through the polished surface to be measured.

FIG. 1 shows the setup of a device according to the invention which comprises, disposed along optical axis A, illuminating means 1, supporting means which are not shown and measuring means 2. The device additionally comprises calculating means 3. The supporting means, which are not shown, should be able to receive an optical component the surface of which is to be analysed and which, in the example shown in FIG. 1, is a progressive lens 4. The shape and position within the setup of one face 5 of this lens 4 are known, and it is desired to determine the characteristics of the second face 6 of the lens 4, in an absolute manner. It will be supposed that the refractive index of progressive lens 4, together with its thickness at a given point, are known.

The illuminating means 1 deliver light having a wavefront of known shape, to the lens 4. This light passes through the lens 4, and is transmitted to the measuring means 2. The measuring means 2 are linked to the calculating means 3, and enable maps of the wavefront slopes of the light to be determined, after transmission thereof by the polished surface 6 to be measured. Determination is done in an image plane of the optical component being measured.

As the shape of the incident wavefront on surface 5 of lens 4 is known, and as the shape of said face 5 together with the refractive index of lens 4 are also known, it is possible to determine, using the calculating means 3, the shape of the wavefront of the incident light hitting the polished surface 6 to be measured. According to the invention, the light transmitted through polished surface 6 is subsequently received by the measuring means 2 which, in combination with the calculating means 3, determine the maps giving the slopes of the wavefront of the light after transmission through the polished surface 6.

Figure 6:
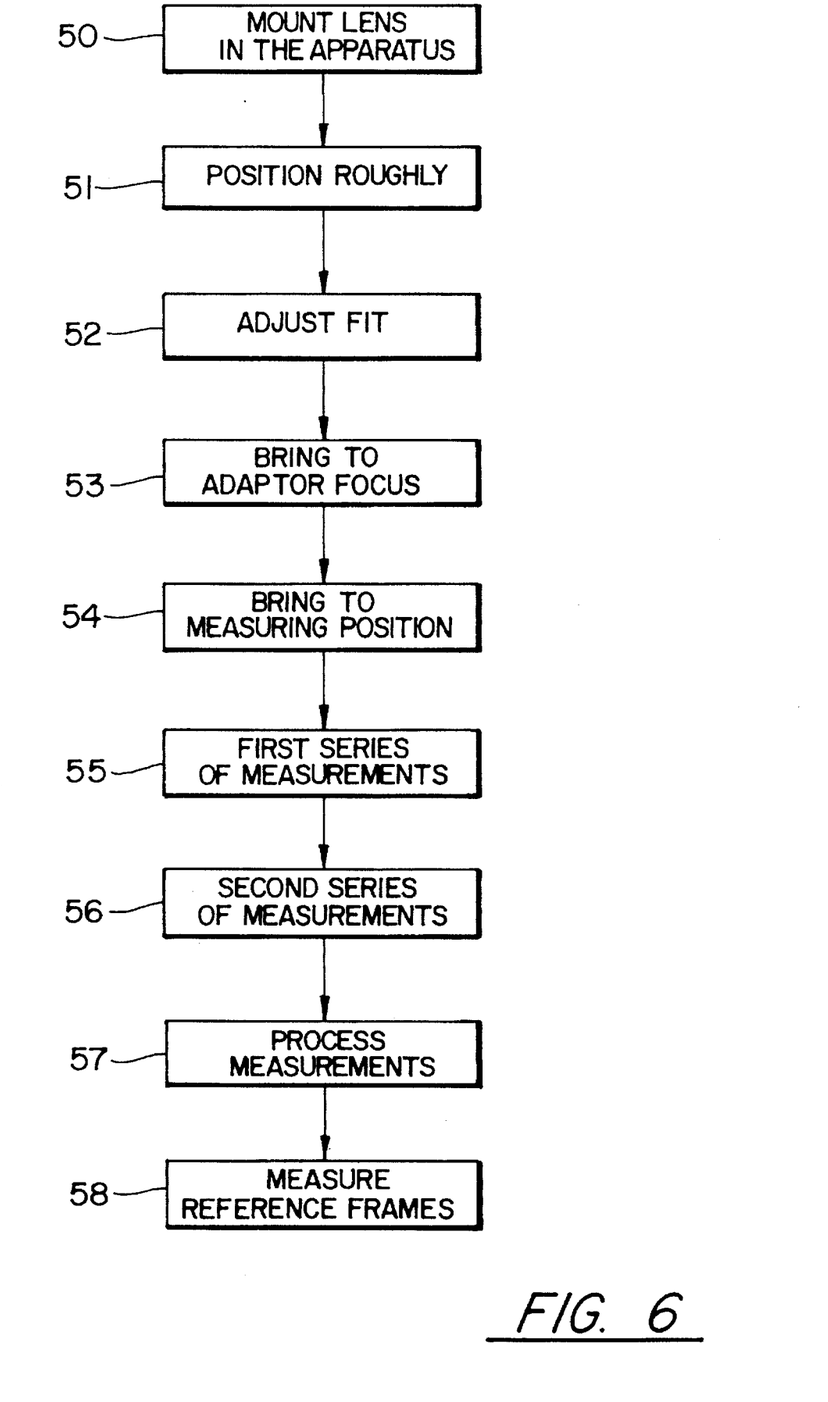
FIG. 6 is a flow chart showing the steps for complete measurement of a polished surface, in a device of the type shown in FIGS. 3, 4 or 5.

The calculating means 3 enable the absolute characteristics of the surface 6 to be obtained from these slopes, as will be explained with reference to FIGS. 6 and 7.

The basic setup shown in FIG. 1 is also suitable for measuring refractive index distribution in an optical component.

Figure 2:
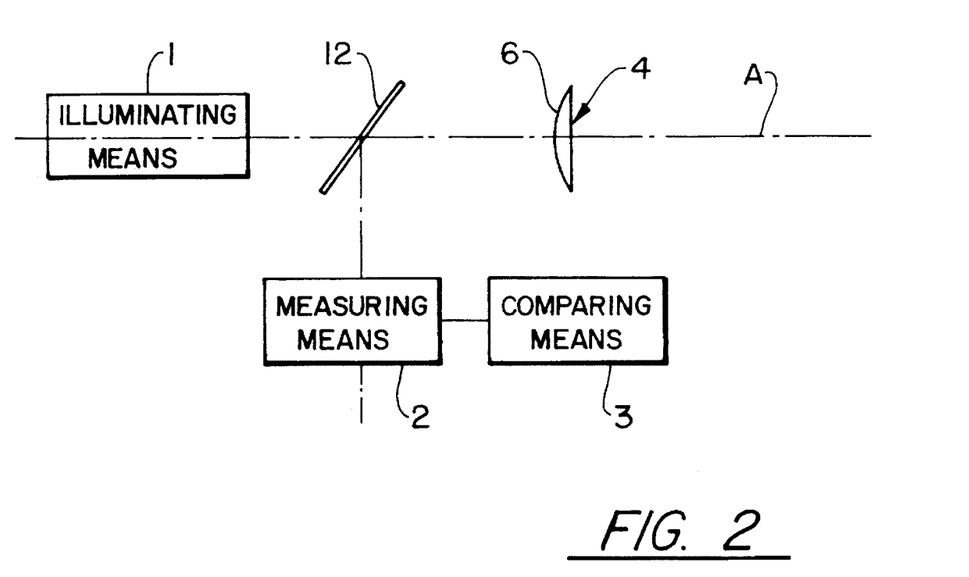
FIG. 2 is a simplified diagram showing a device according to the invention for measuring a polished surface, using reflected light.

FIG. 2 shows the essentials of a device according to the invention for measuring a polished surface, using reflected light. By this we mean measuring the characteristics of polished surface 6 by measuring the light reflected by said surface. The device in FIG. 2 comprises, arranged along optical axis A, illuminating means 1, splitting means 12, supporting means, which are not shown, designed to receive the optical component 4 having the surface 6 which is to be measured. The light supplied by illuminating means 1 is transmitted by the splitting means 12 to the surface 6 at which it is reflected and sent to the measuring means 2 via the splitting means 12. The measuring means, like in the case of the device shown in FIG. 1, determine maps of the wavefront slope of the light in the image plane, and, following this, by the use of calculating means 3, maps of the wavefront slopes of the light after reflection at polished surface 6.

From these slope maps, the computing means 3 enable the absolute characteristics of the surface 6 to be obtained, as will be explained with reference to FIGS. 6 and 7.

Figure 3:
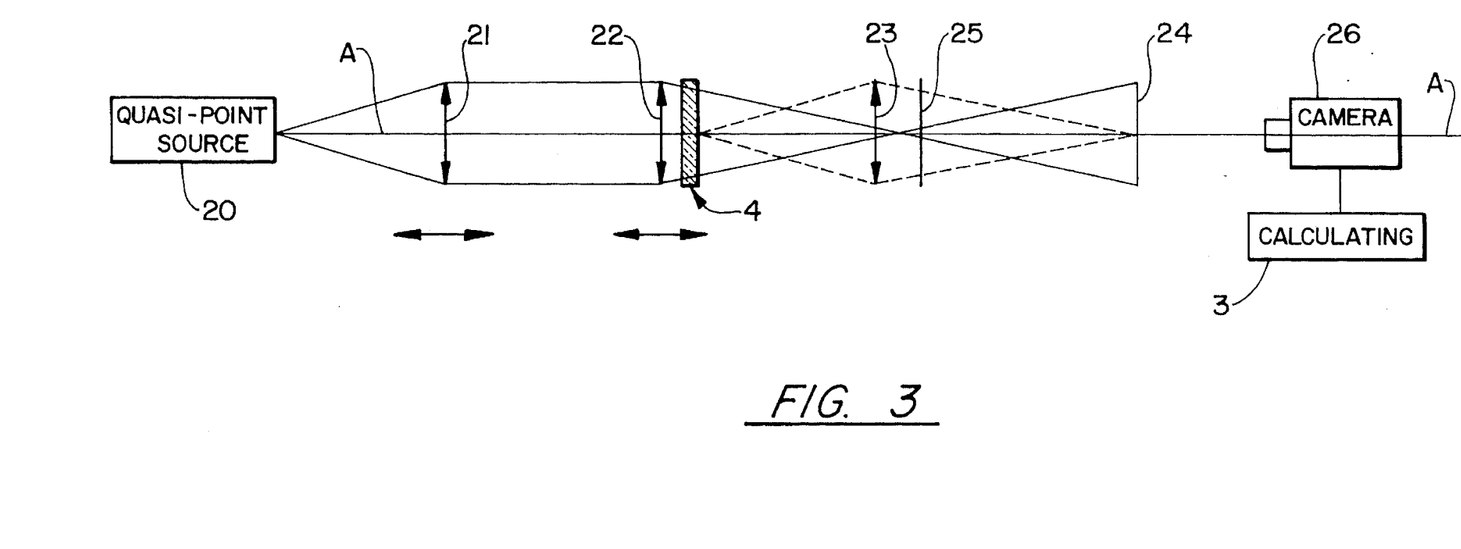
FIG. 3 is a more detailed diagram of one embodiment the device of the type shown in FIG. 1.

FIG. 3 is a more detailed diagram showing one embodiment of a device for measuring an optical component using transmitted light, of the type shown in FIG. 1. In the example in FIG. 3, the optical component consists of a progressive lens 4 having a surface that is to be measured. The device in FIG. 3 comprises, disposed along optical axis A, illuminating means consisting of a quasi-point source 20, an optical system 21 able to be moved along axis A, and a focusing optical system 22. The movable optical system 21 is set to a position along axis A as a function of the power addition factor of the lens to be measured. The focusing optical system 22 has a positive or negative focal point making it possible to analyse lenses of positive or negative optical power. Thus, when measuring progressive lenses, focusing optical system 22 will be positive or negative depending on the sign of progressive lens power in the far vision portion of said lens. The device in FIG. 3 further comprises, arranged along axis A, means for supporting the optical component 4 supported by three translation stages and two rotation elements shown as 100 (see also FIGS. 4, 5, 5a). The measuring means, which are disposed next along optical axis A comprise an optical system 23 for forming the image of component 4 on a mat screen 24. This optical system 23 is followed by a Ronchi grating 25 of a known type, fixed to the former. The image formed through the Ronchi grating on the mat screen 24 is picked up by a camera 26 of the mosaic pattern type. This camera is for example a charge coupled device (CCD) camera able to measure light intensity at a plurality of points on the mat screen. Camera 26 is thus able to supply the computing means 3 with information on light intensity at every point on the mat screen. It can furthermore supply the operator with a picture of the mat screen on a video monitor, for following the measurement operations. In another embodiment of the invention, the image of component 4 formed by the optical system 23 is directly filmed by camera 26, without the intermediary of a mat screen.

The various stages in the measurement of the geometrical structure of the polished surface in the device in FIG. 3 are described in more detail with reference to FIG. 6.

Figure 4:
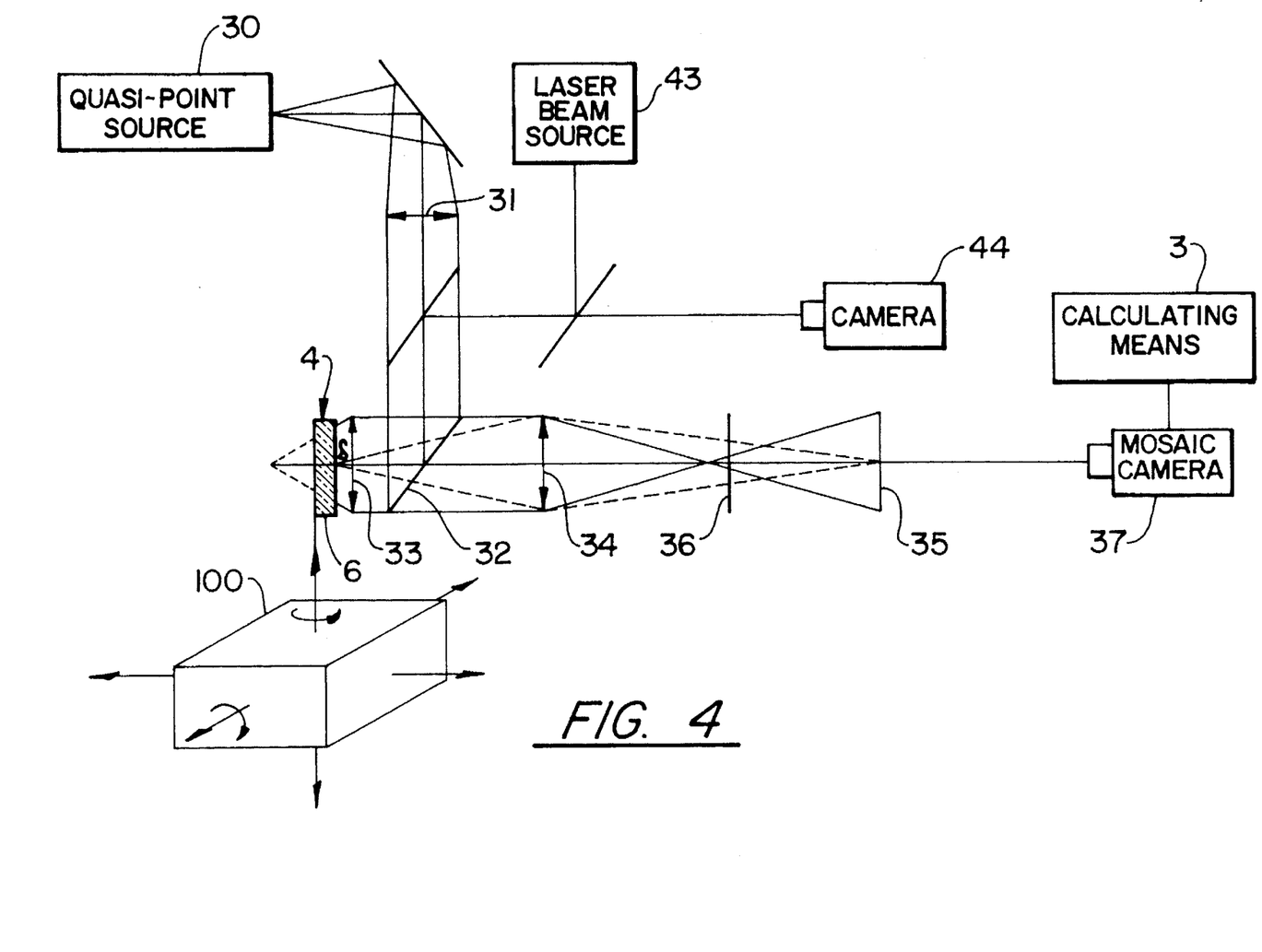
FIG. 4 is a more detailed diagram of one embodiment the device of the type shown in FIG. 2, for measuring convex surfaces using reflected light.

FIG. 4 shows a more detailed diagram of one embodiment of a device using measurement by reflected light, for obtaining the geometrical characteristics of an optical component 4, this device being of the type shown in FIG. 2. The device in FIG. 4 is adapted to measurement of convex surfaces. The device in FIG. 4 comprises a quasi-point source 30 located at the focal point of a focusing optical system 31 which generates a collimated beam. This collimated beam passes through a splitter 32 and an adaptor 33 the power of which depends on the power of the polished surface 6 of the optical component 4 being measured. Adaptor 33 illuminates the surface 6 of the component 4 located at point S using light having a known wavefront. Point I in FIG. 4 is the optical conjugate of point source 30. The power of adaptor 33 is selected as a function of the power of the surface 6 being measured. More precisely, point I is situated between the image of the source provided by the highest power region of surface 6 and that provided by the lowest power region thereof. If we consider the case of a convex progressive lens, point I will be located between the image of the source provided by the near vision region of surface 6 and the image provided by the far vision region thereof.

The light reflected by the surface to be measured passes through the adaptor 33 and then through the splitter 32 to an objective 34, which forms, approximately, an image of the surface to be measured on a mat screen 35 via the Ronchi grating 36. The intersection of the Ronchi grating and the optical axis is the optical conjugate of point I which, in its turn, is the conjugate of point source 30. A camera 37 of the mosaic pattern type picks up the image formed on the mat screen in the same way as was described with reference to FIG. 3.

In the device in FIG. 4, all the portion downstream of splitter 32, in other words objective 34, grating 36, mat screen 35 and camera 37 can be employed for measurement of all convex surfaces and, in the same way, the illuminating portion, in other words source 30 and focusing optical system 31 can be used for all measurements. It is only necessary to change adaptor 33, if needed, as a function of the power of the surface 6 of the lens.

Figure 5:
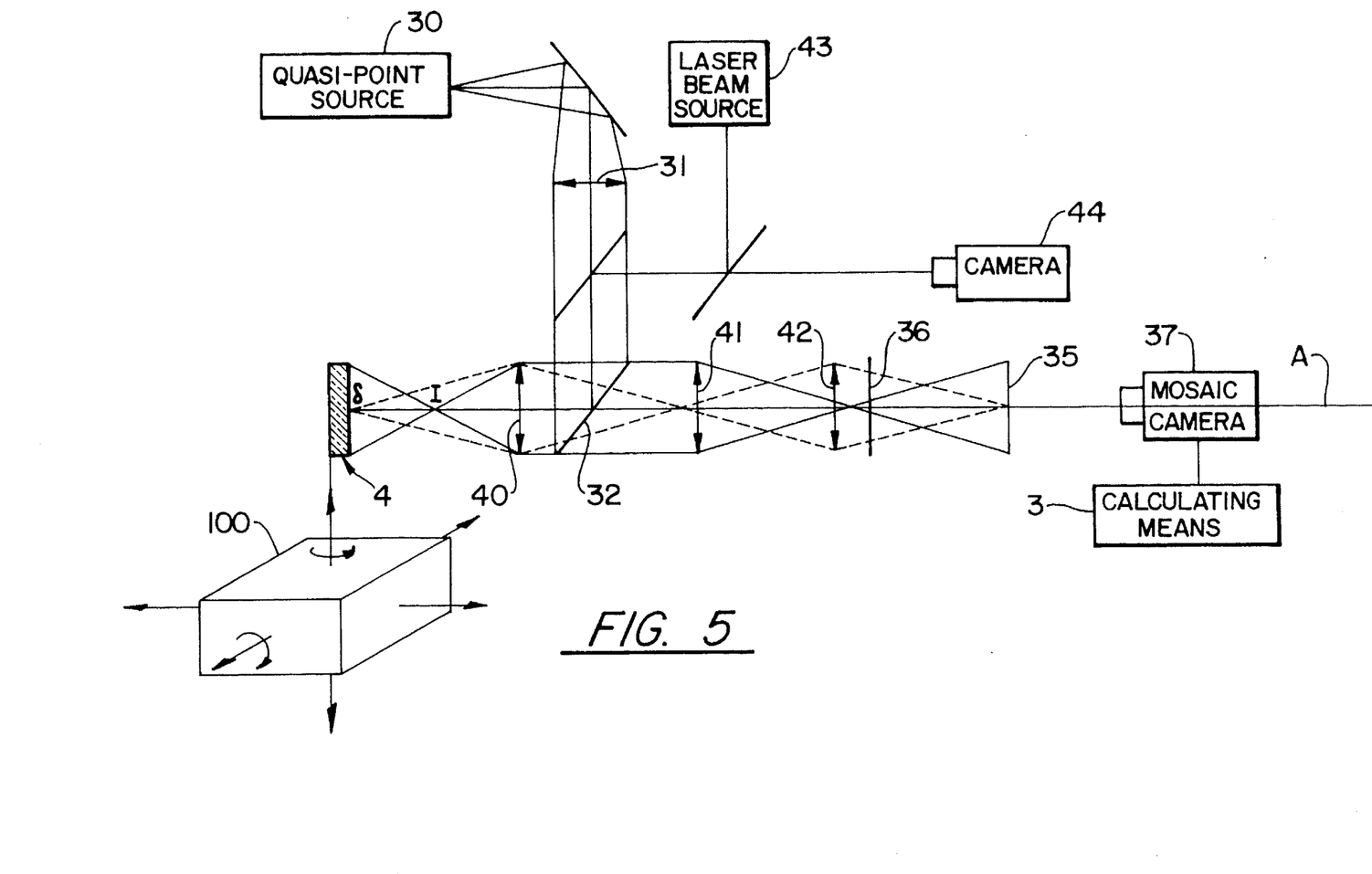
FIG. 5 is a more detailed diagram of one embodiment the device of the type shown in FIG. 2, for measuring concave surfaces using reflected light.

FIG. 5 shows a device similar to the one in FIG. 4, but for the measurement of concave surfaces. Identical elements bear the same reference numerals. This device comprises, like the device in FIG. 4, a light source 30, a focusing optical system 31 and a splitter 32. The device next comprises an adaptor 40 similar to the adaptor 33 in the setup in FIG. 4. Adaptor 40 sends light of a known wavefront towards the concave surface to be studied, situated at point S. Point I is the optical conjugate of point source 30, this being obtained by the optical systems 31, 32 and 40. The relative positions of points S and I, just like the case of the setup in FIG. 4, depends on the minimum and maximum powers of the surface to be measured. The light reflected by the concave surface passes through adaptor 40, splitter 32 towards two objective lenses 41 and 42 which, just like in the device in FIG. 4, form an approximate image of the surface to be measured on the mat screen 35, conjugating point I onto a Ronchi grating 36. The image of element 4 on the mat screen 35 is picked up by mosaic camera 37.

Just like in the case of the device for measuring convex surfaces, the imaging portion, consisting of objective lenses 41 and 42, grating 36, mat screen 35 and camera 37 can be employed for measuring all concave surfaces. The "illuminating" portion consisting of light source 30, focusing optical system 31 and splitter 32 can be common to the device in FIG. 4 and the one in FIG. 5.

Figure 5A:
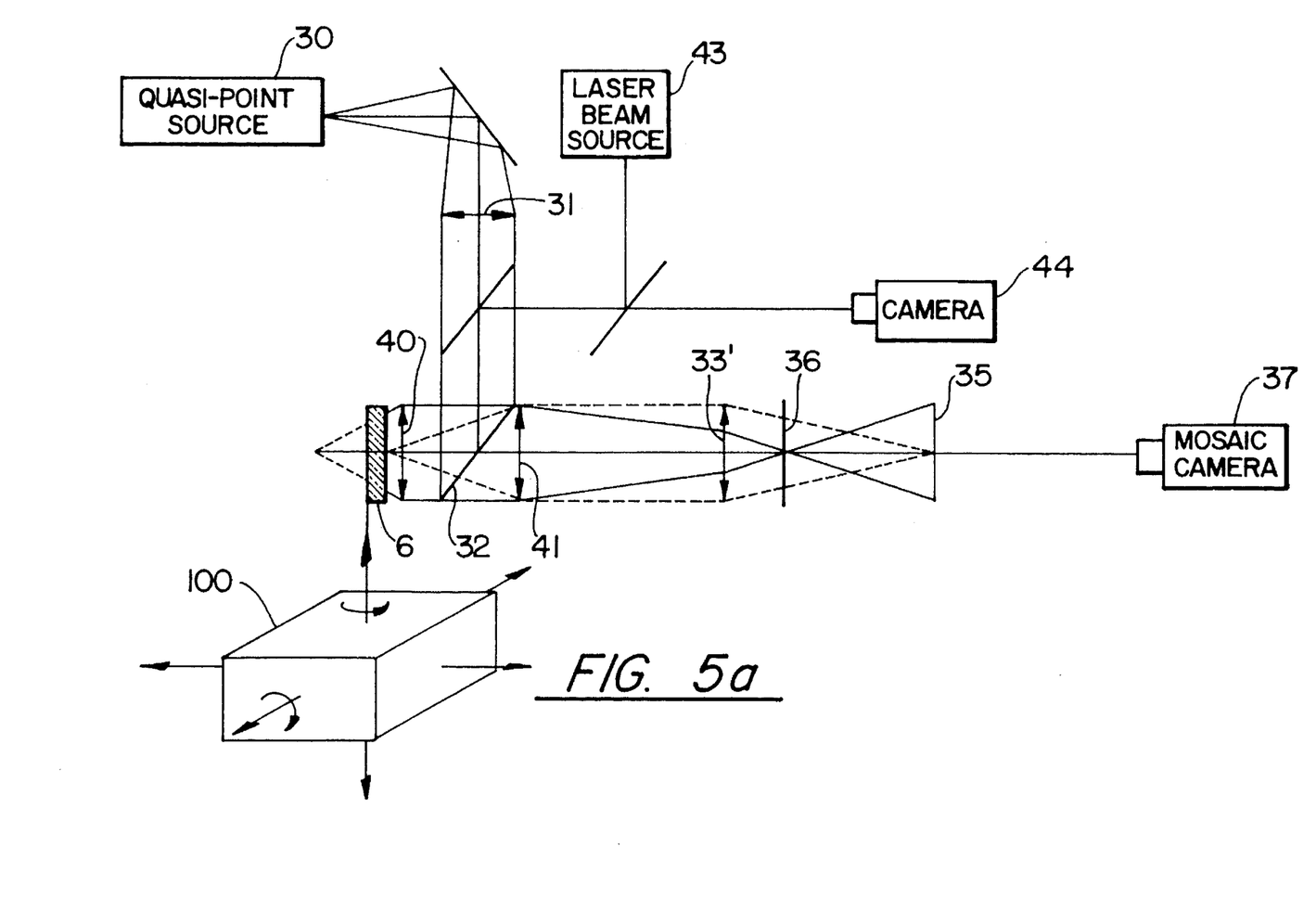
FIG. 5a is a more detailed diagram of one embodiment of the device of the type shown in FIG. 5, but for measuring convex surfaces using reflected light.

FIG. 5a shows a more detailed diagram of one embodiment of a device of the type shown in FIG. 5, but for the measurement of convex surfaces using reflected light. It is identical to the one shown in FIG. 5, except for the fact that objective 42 has been replaced by an objective 33' of different focal lens, without modifying its position in the device. In this way, the setup in FIG. 5 can easily be transferred to the one in FIG. 5a for measuring convex surfaces instead of concave surfaces. Obviously, the reverse modification is also possible. It is thus possible to measure, using one single device, all types of surface simply by replacing one objective lens with another.

The devices described with reference to FIGS. 3, 4, 5 and 5a are designed to illuminate the surface to be measured with light having a quasi-spherical wavefront. However, this is only a particular embodiment and the method according to the invention being able to be applied to any form of incident wavefront.

The operation of the device according to the invention will now be described with reference to FIG. 6. In order to simplify the description, only the operation of the device in FIG. 5 will be described, it being understood that the devices in FIGS. 3, 4 and 5a operate in a similar way. FIG. 6 shows a flow chart of the steps in the complete measurement of the geometrical characteristics of a polished surface; the first step 50 consists in mounting the optical component having the surface to be measured in the support means. It is fixed therein in such a way that the surface to be measured is approximately centered on optical axis A, the normal to the surface at the point of intersection with optical axis A substantially coinciding with said axis A.

Once the optical component has been fixed in place, the support means are shifted, at step 51, in order to bring the surface substantially into proximity with the focal point of adaptor 40. In the device in FIG. 5, the support means bring the surface to be measured close to the point I.

Depending on the characteristics of the surface to be measured, a suitable choice is made of the power of adaptor 40. In practice, it is sufficient to have a rough idea of the average power of the surface to be measured (in the case of measurement using reflection) or of the optical component (in the case where transmitted light is used), this being able to be determined by any known means. For example, in the case of a progressive lens, the basic value is, a priori, a known value, which makes it possible to chose the power of adaptor 40. A set of four adaptors makes it possible to cover the ordinary range of powers between 0.50 and 10 diopters.

At step 52, the tilt of the element is finally adjusted to ensure it is correctly aligned. By alignment we mean determination of the path of a given ray leaving source 30 right up to the mat screen 35, or, what amounts to the same thing, determination of the normal to the surface to be measured, at the point of intersection with the optical axis. Such alignment makes it possible to fix an origin in the plane of the grating.

According to the invention, such alignment can be done in a simple and accurate manner using a laser beam 43 sent along the optical axis A of the device. For this, when constructing the device, the intersection of the optical axis with the mat screen 35 is materialized using, for example, a mirror situated at point I in the support means, arranged perpendicularly to the optical axis. The intersection of the optical axis with the mat screen 35 can subsequently be materialized on the actual image supplied by the camera 37, for example by means of a software-generated grating.

To facilitate successive computations, the invention proposes to correct, on the support means, the orientation of the surface to be measured so as to bring the intersection of the laser beam inside the grating in the image from camera 37. In this way, the line normal to the surface to be measured at the point of intersection with optical axis A coincides with said optical axis.

Obviously, it will also be possible, in order to achieve such alignment, to leave the orientation of the surface to be measured unchanged and to acquire, on the image from camera 37, the position of the reflected laser beam.

At step 53, the surface to be measured is accurately positioned at the focal point of adaptor 40.

At step 54, the measuring means move along optical axis A, in order to bring the surface to be measured to the measurement position. As explained with reference to FIG. 4, the measurement position is a position for which point I, which is a virtual source, is situated between rays that have passed through the area of highest power of the surface to be measured and the rays that have passed through the region of lowest power. In practice, the measurement position is determined by approximate prior knowledge of the base value and power addition factor of the surface to be measured.

At step 55, a first series of measurements is made in a direction perpendicular to the optical axis and, for example, in the direction X perpendicular to said optical axis, and lying in the plane of FIG. 5. As described in the literature, these measurements consist in recording light strength information at different points of camera 37, for varying positions of the Ronchi grating. Stated in other terms, recordings are made of the images corresponding to the fringes due to the grating, the grating being moved on each occasion in its plane, perpendicularly to the direction of the lines on the grating.

At step 56, the grating is turned through 90°, and a new series of measurement is commenced similar to those obtained for step 55.

Figure 7:
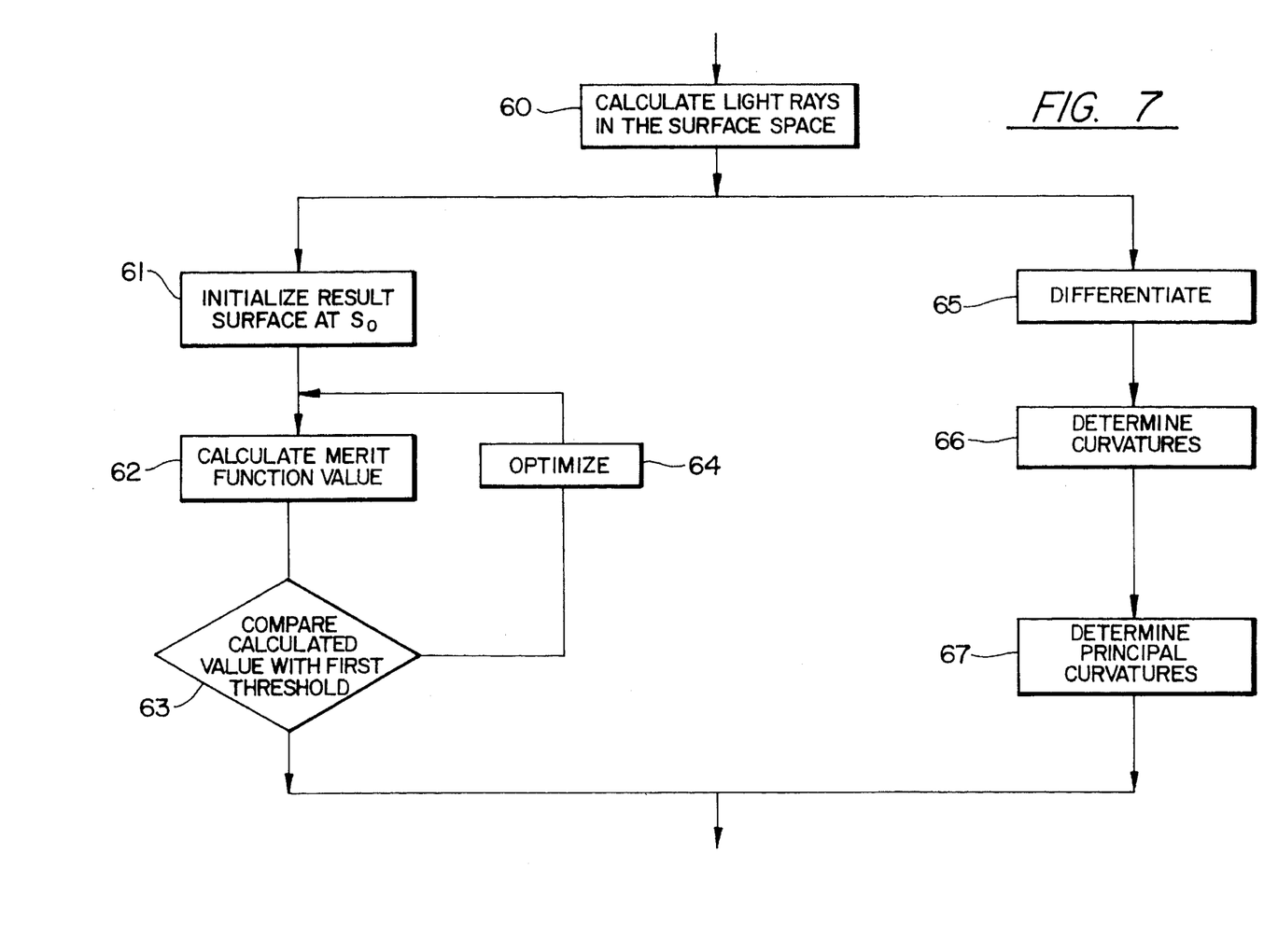
FIG. 7 is a flow chart showing the steps of calculation, in one embodiment of the method according to the invention.

At step 57, the results obtained in steps 55 and 56 are supplied to the computing means in order to be processed, as explained more in detail with reference to FIG. 7. In this way, the characteristics of the surface to be measured are determined.

At step 58, the characteristics of the surface to be measured are known; nevertheless, these characteristics are known in a reference frame linked to the device and not to the actual surface to be measured. Stated in other terms, the characteristics determined according to the invention are known with respect to the means used to support the surface to be measured. It is hence important, in order to be able to use these results, to carry out a change of reference frame in order to know the characteristics of the surface in its own reference frame. In the case of an optical lens, this reference frame is generally constituted by engravings on the surface, for example two engraved micro-circles.

According to the invention, the change of reference frame can be done by employing the support means for the element to be measured, said support means being designed to move not only along the optical axis but also in a plane orthogonal thereto. For example, the support means are mounted on two motor-driven slides which move parallel to the rows and columns of camera 37. Change of reference frame can then be achieved using the laser beam which puts into material form the optical axis of the device, and which has already been mentioned in the description of step 52.

In order to change reference frame, the initial step consists in bringing back the surface to be measured to the focal point of adaptor 40. This is achieved, like in step 51, by moving the support means along the optical axis. After this, the element to be measured is moved in a plane perpendicular to the optical axis, and optionally along the optical axis in order to bring an engraving into coincidence with the focal point of adaptor 40. The image of the engraving provided by adaptor 40 is received by the camera 44 on which the intersection of the optical axis with the plane of the CCD (charge-coupled device) of the camera is viewed with the aid of cross-hairs.

When the image (of the engraving) supplied by the camera 44 is centered on the cross-hairs, the displacements made in the plane perpendicular to the optical axis are noted. Following this, a similar procedure is adopted for the other engravings.

In this way, the position of the engravings is known in a reference frame linked to the measurement device. Thanks to the alignment procedure, the line normal to the surface to be measured at its intersection with optical axis is known. These elements make it possible to carry out a simple change of reference frame, in order to supply, as an output signal, the characteristics of a surface to be measured in a reference frame linked to the engravings thereon.

Following step 58, the characteristics of the surface to be measured are available in a reference frame linked to said surface. It is then possible to go on to measurement of another surface.

Description of the operation of the device, which has been done with reference to FIG. 5 extents, mutatis mutandis, to the devices in FIGS. 3 and 4.

FIG. 7 shows a flow chart of the measurement and computing steps in one embodiment of the method according to the invention. In the remainder of the description, we have employed, to facilitate explanation, an ortho-normed reference frame the z axis of which lies along the optical axis of the system. In such a reference frame, the surface to be measured can be represented by a function $z=f(x,y)$.

At step 60, the images obtained at step 55 and 56 make it possible to calculate, by phase detection, the position of intersection of each light beam in the plane of the grating.

As the transverse magnifications of camera 37 are known, it is possible to deduce therefrom the position of the intersection of each light beam with the plane of the mat screen; knowing perfectly the distance between the grating and the mat screen, it is possible to deduce the equation for each light beam therefrom.

Following this, using optical calculation, transposition of the light beams from the space where they were measured to the space of the optical item being measured is achieved. Such transposition of the rays makes it possible to simplify, and accelerate, the computing step of the method according to the invention. This will become more clear below, when the merit function employed in the calculation step according to the invention is described.

In a first embodiment of the invention, the computing steps 61 to 64 make it possible to determine the geometrical characteristics of the optical component to be measured, in the form of a three-dimensional representation of the surface to be measured.

At step 61, a final result surface is initialized by making use of a simple starting surface $S_D$, in other words an initial surface shape is provided.

At step 62, calculation is done for this final result surface, and, consequently for the first time for said simple starting surface $S_D$, of the value of a merit function, said merit function representing variations introduced into the measurement system when the surface to be measured is replaced by the result surface.

Stated in other terms, a comparison is made between the real situation in the measurement system and the situation that the result surface would have created if it had been placed in the measurement system as a replacement for the surface to be measured. It is possible to calculate the effects of the result surface as, a priori, all the characteristics of the measurement are known, only the surface to be measured being unknown. It is thus possible to simulate the presence of the result surface in the measurement system.

The merit function is chosen so as to have a zero minimum value when the result surface is exactly equal to the measurement surface. One example of a merit function is described in more detail below.

At step 63, the value of the merit function thus calculated is compared with a first predetermined threshold value. If the value found is higher than said threshold value, control passes to step 64; otherwise, it is considered that the result surface thus obtained is a good approximation of the surface to be measured. This calculation makes it possible to avoid pursuing calculation if the result surface has made it possible to rapidly obtain a representation of the surface to be measured with sufficient accuracy.

At step 64, optimization of the result surface is carried out. In effect, the merit function is a function of a result surface. Because of this, it is possible to optimize the result surface using a optimization method such as, for example optimization using the least squares method. This makes it possible to obtain a fresh result surface in the form of an intermediate surface $S_I$. This surface $S_I$ represents an approximation of the surface to be measured which can be sufficient at least in certain embodiments of the invention. According to the invention, it is also possible to proceed with a plurality of optimization steps. In this case, following step 64, return to step 62 occurs, with the surface $S_I$ obtained.

Then fresh calculation of the merit function is made for the result surface or current intermediate surface; at step 63 it is possible not only to compare the value of the merit function with the first predetermined threshold value, but also to compare it with the value obtained at the preceding step. If the difference between the values obtained between two successive steps is only very small, in other words if it is less than a second predetermined threshold value, it is considered that surface $S_I$ is a sufficiently accurate representation of the surface to be measured. This in fact means that there is only a small variation between the calculated result surfaces in two successive steps.

We shall now describe, by way of example, a merit function that can be used in the method according to the invention. This merit function is obtained by considering a plurality of light beams which are reflected or transmitted by the surface to be measured. For each light beam, calculation is made, using a ray tracing program, of the theoretical light beam, which, upon arriving at the result surface, i.e. at the simple starting surface $S_D$ or at an intermediate surface $S_I$, would be reflected or transmitted in the same way. In other words, a light beam downstream of a surface to be measured is considered and, using the ray tracing program, the path that this light beam would have travelled if the surface to be measured had been replaced by the simple starting surface $S_D$ or an intermediate surface $S_I$ is traced backwards. Knowledge of the various parts of the measurement device makes it possible to calculate the path of the light beam $S_D$ up to the plane of the source.

As has been mentioned above, it is advantageous to have transposed, using optical calculation, the light beams from the space they were measured at to the space of the measured item. Because of this, when calculating the merit function, the path of the light beam is traced back not from the space where it was measured at, but from the space immediately following the surface to be measured.

In the case where a point source is used in the measurement device, it is possible to trace the light beam back right up to the plane of the source. The distance between the light beam and the center of the point source is calculated in this plane.

In order to obtain the merit function, the squares of the distances thus calculated are added for the plurality of the rays. This merit function is thus representative of the local deviations between the surface to be measured and the result surface (simple starting surface $S_D$ or intermediate surface $S_I$) at the points of reflection or transmission of each light ray of the plurality of rays.

Obviously, any other type of merit function can be employed and, in particular, the deviations between the rays can be calculated in a plane other than the plane of the source.

In order to represent the result surface, the simple starting surface or the intermediate surfaces, it is advantageous to employ a function which is a linear combination of a family of orthogonal functions. In this case, the merit function is a function of the various coefficients of the linear combination. Optimization can then be carried out by varying the various coefficients, for example using a least-squares type method.

The use of a family of orthogonal functions is particularly advantageous if the method according to the invention includes a plurality of optimisation steps. Because of this, if in an optimization step, functions are added to the linear combination, it can be supposed that because of the orthogonality of the various functions, the coefficients of the previously-calculated linear function will only vary slightly, if at all.

Thus, Zernike polynomials, which are orthogonal on a disc can be employed to represent the result surface. The simple starting surface can then be initialized using a parabola, represented by a second degree Zernike polynomial. At the initialization step, the surface to be measured is a parabola and is thus represented by the zero, first and second degree Zernike polynomials: optimization is performed on three coefficients. A plurality of optimization steps are carried out repeatedly using a function represented by the zero, first and second degree polynomials as long as, at each step, the variation in the value of the merit function is above a third predetermined threshold value. When the value of the merit function starts to only vary by an amount less than the third threshold value, the function representing the intermediate surface is completed by the third, fourth and fifth degree Zernike polynomials. The merit function is calculated once again (step 62), and then at step 63, it is determined if the approximation obtained is sufficient, by comparing the value of the merit function with the first threshold value mentioned above. In the case of a relatively regular surface, one can thus already obtain a satisfactory representation.

One then continues in the same way, progressively increasing the maximum degree of the Zernike polynomial to 10, 15 and 20.

The use of a plurality of increasing degree optimization steps, according to the invention, offers, on the one hand, the advantage that it is possible to stop the calculations at any time if the value of the merit function falls below the first predetermined threshold value as explained above. This, secondly, gives the advantage of speeding up the calculations which are much faster for the lower degrees. It also makes it possible to converge to a solution in which the degree of noise is reduced.

The description above can be readily extended to the measurement of the optical structure of an optical component, and, for example, to measurement of the refractive index distribution of a graded index optical component, in other words a component consisting of a variable refractive index material bordered by two known dioptric values.

In a second embodiment of the invention, the computing step makes it possible to determine the characteristics of the surface under analysis in the form of maps giving the principal curvatures of said surface.

At step 65, one starts out by calculating, at a plurality of points, the derivatives of the information obtained in the optical system's space, during the measurement phase.

At step 66, the curvatures of the wavefront after reflection at the surface to be measured, or transmission at said surface, are determined on the basis of said derivatives.

At step 67, knowing the shape of the incident wave, the principal curvatures of the surface to be measured are determined.

The present invention is obviously not limited to the embodiments that have been described and illustrated, but may undergo numerous variations available to those skilled in the art without this however leading to a departure from the invention as claimed.

What is claimed is:

1. A method of measuring directly a surface topography of an optical component in a measuring system comprising the steps of:

illuminating said optical component with incident light having a known wavefront, said light having wavefront slopes, measuring, in a given plane, maps of wavefront slopes of said light, after reflection off said optical component or transmission through said optical component, deducing the surface topography of said optical component from said measurements of the maps of wavefront slopes by application of at least one calculating procedure comprising:

providing a result surface which is a simple starting surface $S_D$, an iterative optimization process with ray tracing in the measuring system, comprising performing at least once:

calculation of a value of a merit function representative of a departure between the result surface and a surface of the optical component being measured;

minimizing the value of the merit function by varying said result surface, wherein said varying is expressed in form of at least one intermediate surface $S_I$.

2. Method according to claim 1, wherein the step of measuring maps of wavefront slopes of said light after reflection at said optical component or transmission by said optical component is carried out by determining, using a deflectometric method, paths of a plurality of rays of said light in an image space of the optical component being measured.

3. Method according to claim 2, wherein said deflectometric method is a geometric method employing insertion of a Ronchi grating on a path of the light reflected at said optical component or transmitted by said optical component.

4. Method according to claim 2, further comprising a step of transposing said plurality of rays into a space of the optical component to be measured, using said ray tracing.

5. Method according to claim 1, wherein said result surface, said simple surface $S_D$ and the at least one intermediate surface $S_I$ are represented by a linear combination of a family of orthogonal functions.

6. Method according to claim 5, wherein said iterative optimization process comprises performing a plurality of times said calculation and said minimizing, wherein said orthogonal functions of said family are polynomials and wherein a maximum degree of polynomials of said linear combination in a step of performing said calculation and said minimizing is higher than or equal to a maximum degree of polynomials of said combination in a preceding step of performing said calculation and said minimizing.

7. Method according to claim 1, wherein said iterative optimization process comprises performing a plurality of times said calculation and said minimizing.

8. Method according to claim 1, wherein said minimizing the value of said merit function is carried out using a least squares method.

9. Method according to claim 1, wherein a quasi-point source is employed and in which said calculation of a value of the merit function is carried out:

by calculating, for each ray of a plurality of rays of said light, after reflection at said optical component or transmission by said optical component:

an incident luminous ray which, upon arriving at said result surface, would be reflected or transmitted in a direction of the measured ray, a distance, in a plane of said quasi-point source or in a plane conjugate with said plane, between a point of impact of said incident luminous ray and a center of said quasi-point source, by adding, for said plurality of rays, squares of distance thus calculated for each one of said rays.

10. A method of measuring directly a surface topography of an optical component in a measuring system comprising the steps of:

illuminating said optical component with incident light having a known wavefront, said light having wavefront slopes;

measuring, in a given plane, maps of wavefront slopes of said light, after reflection off said optical component or transmission through said optical component, by determining, using a deflectometric method, paths of a plurality of rays of said light in an image space of the optical component being measured, deducing the surface topography of said optical component from said measurements of the maps of wavefront slopes by application of at least one calculating procedure comprising:

providing a result surface which is a simple starting surface $S_D$, an iterative optimization process with ray tracing in the measuring system, comprising performing at least once:

calculation of a value of a merit function representative of a departure between the result surface and a surface of the optical component being measured;

minimizing the value of the merit function by varying said result surface, wherein said varying is expressed in form of at least one intermediate surface $S_I$, said result surface, said simple starting surface $S_D$ and the at least one intermediate surface $S_I$ being represented by a linear combination of a family of orthogonal functions.

11. Method according to claim 10, wherein said deflectometric method is a geometric method employing insertion of a Ronchi grating on a path of the light reflected at said optical component or transmitted by said optical component.

12. Method according to claim 10, wherein it further comprises a step of transposing said plurality of rays into a space of the optical component to be measured, using optical calculation.

13. Method according to claim 10, wherein said iterative optimization process comprises performing a plurality of times said calculation and said minimizing.

14. Method according to clam 13, wherein said iterative optimization process comprises performing a plurality of times said calculation and said minimizing, wherein said orthogonal functions of said family are polynomials and wherein a maximum degree of polynomials of said linear combination in a step of performing said calculation and said minimizing is higher than or equal to a maximum degree of polynomials of said combination in a preceding step of performing said calculation and said minimizing.

15. Method according to claim 10, wherein said minimizing the value of said merit function is carried out using a least squares method.

16. Method according to claim 10, wherein a quasi-point source is employed and in which said calculation of a value of the merit function is carried out:

by calculating, for each ray of a plurality of rays of said light, after reflection at said optical component or transmission by said optical component:

an incident luminous ray which, upon arriving at said result surface, would be reflected or transmitted in a direction of the measured ray, a distance, in a plane of said quasi-point source or in a plane conjugate with said plane, between a point of impact of said incident luminous ray and a center of said quasi-point source, by adding, for said plurality of rays, squares of distance thus calculated for each one of said rays.

17. A method of measuring directly a refractive index distribution of an optical component in a measuring system comprising the steps of:

illuminating said optical component with incident light having a known wavefront, said light having wavefront slopes;

measuring, in a given plane, maps of wavefront slopes of said light, after transmission through said optical component, deducing the refractive index distribution of said optical component from said measurements of the maps of wavefront slopes by application of at least one calculating procedure comprising:

providing a result refractive index distribution which is a simple starting refractive index distribution $N_D$, an iterative optimization process with ray tracing in the measuring system, comprising performing at least once:

calculation of a value of a merit function representative of a departure between the result refractive index distribution and a refractive index distribution of the optical component being measured;

minimizing the value of the merit function by varying said result refractive index distribution, wherein said varying is expressed in form of at least one intermediate refractive index distribution $N_I$.

18. Method according to claim 17, wherein the step of measuring maps of the wavefront slopes of said light after transmission by said optical component is carried out by determining, using a deflectometric method, paths of a plurality of rays of said light in an image space of the optical component being measured.

19. Method according to claim 18, wherein said deflectometric method is a geometric method employing insertion of a Ronchi grating on a path of the light transmitted by said optical component.

20. Method according to claim 19, wherein it further comprises a step of transposing said plurality of rays into a space of the optical component to be measured, using said ray tracing.

21. Method according to claim 17, wherein said result refractive index distribution, said simple starting refractive index distribution $N_D$ and the at least one intermediate refractive index distribution $N_I$ are represented by a linear combination of a family of orthogonal functions.

22. Method according to claim 21, wherein said iterative optimization process comprises performing a plurality of times said calculation and said minimizing, wherein orthogonal functions of said family are polynomials and wherein a maximum degree of polynomials of said linear combination in a step of performing said calculation and said minimizing is higher than or equal to a maximum degree of polynomials of said combination in a preceding step of performing said calculation and said minimizing.

23. Method according to claim 17, wherein said iterative optimization process comprises performing a plurality of times said calculation and said minimizing.

24. Method according to claim 17, wherein said minimizing of a value of said merit function is carried out using a least squares method.

25. Method according to claim 17, wherein a quasi-point source is employed and in which calculation of a value of the merit function is carried out:

by calculating, for each ray of a plurality of rays of said light, after transmission by said optical component:

an incident luminous ray which, upon arriving at said result refractive index distribution, would be reflected or transmitted in a direction of the measured ray, a distance, in a plane of said quasi-point source or in a plane conjugate with said plane, between a point of impact of said incident luminous ray and a center of said quasi-point source, by adding, for said plurality of rays, squares of distance thus calculated for each one of said rays.

26. A method of measuring directly a refractive index distribution of an optical component in a measuring system comprising the steps of:

illuminating said optical component with incident light having a known wavefront, said light having wavefront slopes;

measuring, in a given plane, maps of wavefront slopes of said light, after transmission through said optical component, by determining, using a deflectometric method, paths of a plurality of rays of said light in an image space of the optical component being measured, deducing the refractive index distribution of said optical component from said measurements of the maps of wavefront slopes by application of at least one calculating procedure comprising:

providing a result refractive index distribution which is a simple starting refractive index distribution $N_D$, an iterative optimization process with ray tracing in the measuring system, comprising performing at least once:

calculation of a value of a merit function representative of a departure between the result refractive index distribution and a refractive index distribution of the optical component being measured;

minimizing the value of the merit function by varying said result refractive index distribution, wherein said varying is expressed in form of at least one intermediate refractive index distribution $N_I$, said result refractive index distribution, said simple starting refractive index distribution $N_D$ and the at least one intermediate refractive index distribution $N_I$ being represented by a linear combination of a family of orthogonal functions.

27. Method according to claim 26, wherein said deflectometric method is a geometric method employing insertion of a Ronchi grating on a path of the light transmitted by said optical component.

28. Method according to claim 26, wherein the method further comprises a step of transposing said plurality of rays into a space of the optical component to be measured, using ray tracing.

29. Method according to claim 26, wherein said iterative optimization process comprises performing a plurality of times said calculation and said minimizing.

30. Method according to claim 29, wherein said orthogonal functions of said family are polynomials and wherein a maximum degree of polynomials of said linear combination in a step of performing said calculation and said minimizing is higher than or equal to a maximum degree of polynomials of said combination in a preceding step of performing said calculation and said minimizing.

31. Method according to claim 26, wherein said minimization of a value of said merit function is carried out using a least squares method.

32. Method according to claim 26, wherein a quasi-point source is employed and in which calculation of the value of the merit function is carried out:

by calculating, for each ray of a plurality of rays of said light, after transmission by said optical component:

an incident luminous ray which, upon arriving at said result refractive index distribution, would be reflected or transmitted in a direction of the measured ray, a distance, in a plane of said quasi-point source or in a plane conjugate with said plane, between a point of impact of said incident luminous ray and a center of said quasi-point source, by adding, for said plurality of rays, squares of distance thus calculated for each one of said rays.

33. A method of measuring directly surface topography of an optical component in a measuring system, comprising the steps of:

illuminating said optical component with incident light having a known wavefront, said light having wavefront slopes, measuring, in a given plane, maps of wavefront slopes of said light, after reflection at said optical component or transmission by said optical component, deducing the surface topography of said optical component from said measurements of maps of wavefront slopes by application of at least one calculating procedure for determining characteristics of the surface topography of the optical component to be analyzed in form of maps of its principal curvatures, and comprising:

a step in which derivatives are calculated, in several directions, of maps of wavefront slopes of said light after reflection at said optical component or transmission by said optical component, a calculation step starting from said derivatives, for curvatures of the wavefront of light after reflection at said optical component or transmission by said optical component, a step for computing a map of the principal curvatures of the surface topography of the optical component to be measured, starting from the curvatures thus calculated, and knowing the wavefront of the light incident on the optical component.

34. Method according to claim 33, wherein the step of measuring maps of the wavefront slopes of said light after reflection at said optical component or transmission by said optical component is carried out by determining, using a deflectometric method, paths of a plurality of rays of said light in an image space of the optical component being measured.

35. Method according to claim 34, wherein said deflectometric method is a geometric method employing insertion of a Ronchi grating on a path of the light reflected at said optical component or transmitted by said optical component.

36. Method according to claim 35, wherein it further comprises a step of transposing said plurality of rays into a space of the optical component to be measured, using ray tracing.

37. Method according to claim 34, wherein it further comprises a step of transposing said plurality of rays into a space of the optical component to be measured, using ray tracing.

38. A device for direct measurement of a geometrical or an optical structure of an optical component to be measured, comprising:

means for illuminating the optical component to be measured with light having a known wavefront, said light having wavefront slopes;

means for supporting the optical component to be measured, means for measuring, in a given plane, maps of wavefront slopes of said light after reflection off said optical component or transmission by said optical component, and calculating means receiving results out-putted by said measuring means and deducing the geometrical or optical structure of said optical component from said measurements of maps of wavefront slopes, using an iterative optimization process.

39. Device according to claim 38, wherein said measuring means comprise a Ronchi grating, a mat screen and a charge-coupled-device camera.

40. Device according to claim 38, wherein said measuring means comprise a Ronchi grating and a charge-coupled-device camera.

41. Device according to claim 38, wherein said means for illuminating the optical component to be measured comprise a quasi-point source and a system for imaging said source.

42. Device according to claim 38, wherein said calculating means comprise a ray tracing program.

43. Device according to claim 38, wherein said device for direct measurement further comprises a laser beam used to materialize an optical axis of said device.

44. Device according to claim 38, wherein said support means are displaceable along an optical axis of said device or in a plane orthogonal thereto.

* * * * *